United States Patent
Li et al.

(10) Patent No.: US 11,023,210 B2
(45) Date of Patent: Jun. 1, 2021

(54) GENERATING PROGRAM ANALYSIS RULES BASED ON CODING STANDARD DOCUMENTS

(71) Applicant: International Business Machines Corporation, Armonk, NY (US)

(72) Inventors: Yu Li, Qingdao (CN); Zi Lin Zhang, Nianchong (CN); Yingyi Wang, Suzhou (CN); Miao Guo, Beijing (CN); Yi Bin Wang, Beijing (CN); Yao Xing Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 16/358,743

(22) Filed: Mar. 20, 2019

(65) Prior Publication Data

US 2020/0301672 A1 Sep. 24, 2020

(51) Int. Cl.
| | |
|---|---|
| G06F 9/44 | (2018.01) |
| G06F 8/10 | (2018.01) |
| G06F 11/36 | (2006.01) |
| G06F 8/71 | (2018.01) |
| G06N 3/08 | (2006.01) |
| G06F 8/73 | (2018.01) |

(52) U.S. Cl.
CPC .................. *G06F 8/10* (2013.01); *G06F 8/71* (2013.01); *G06F 8/73* (2013.01); *G06F 11/3664* (2013.01); *G06F 11/3668* (2013.01); *G06N 3/08* (2013.01)

(58) Field of Classification Search
CPC ..... G06F 8/10; G06F 8/71; G06F 8/73; G06F 11/3664; G06F 11/3668; G06N 3/08

USPC .................................................. 717/124–130
See application file for complete search history.

(56) References Cited

U.S. PATENT DOCUMENTS 9,678,746 B2   6/2017  Abuelsaad
9,851,949 B2 * 12/2017  Howard .................... G06F 8/40

FOREIGN PATENT DOCUMENTS

CN      103678118 A      3/2014
CN      103678118 B      9/2016

OTHER PUBLICATIONS

Dragoni et al., "Combining NLP Approaches for Rule Extraction From Legal Documents", Hal Id: hal-01572443, <https://hal.archives-ouvertes.fr/hal-01572443>, Submitted on Aug. 7, 2017, 14 pages.

* cited by examiner

*Primary Examiner* — Chuck O Kendall
(74) *Attorney, Agent, or Firm* — Randy E. Tejeda (57) ABSTRACT

In an approach to generating program analysis rules, one or more computer processors identify one or more unassociated code standard documents. The one or more computer processors feed the one or more unassociated code standard documents into a cognitive model, wherein the cognitive model utilizes one or more historical code standard documents based on the unassociated code standard documents and associated program analysis rules based on the unassociated code standard documents, wherein the historical code standard documents are natural language documents and the program analysis rules are programmatic. The one or more computer processors generate, based on one or more calculations by the cognitive model, one or more program analysis rules. The one or more computer processors correct one or more programmatic errors or one or more stylistic errors based on the generated one or more program analysis rules.

20 Claims, 4 Drawing Sheets

GENERATING PROGRAM ANALYSIS RULES BASED ON CODING STANDARD DOCUMENTS

BACKGROUND

The present invention relates generally to the field of software development, and more particularly to generating program analysis rules utilizing cognitive models.

Static program analysis is the analysis of computer software that is performed without executing programs, in contrast with dynamic analysis, which is analysis performed on programs while executing. In most cases analysis is performed on the source code, and in the other cases, some form of the object code. The sophistication of the analysis performed by tools varies from those that only consider the behavior of specific statements and declarations, to those that include the complete source code of a program. The uses of the information obtained from the analysis vary from highlighting possible coding errors (e.g., the lint tool) to formal methods that mathematically prove properties about a given program (e.g., behavior matches that of the specification). Program analysis tools are commonly known as linters (i.e., a tool that analyzes source code to flag programming errors, bugs, stylistic errors, suspicious constructs, etc.).

Artificial neural networks (ANN) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in image recognition, ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from the learning material. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

A recurrent neural network (RNN) is a class of ANN where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell.

SUMMARY

Embodiments of the present invention disclose a method, a computer program product, and a system for generating program analysis rules. The method includes one or more computer processors identifying one or more unassociated code standard documents. The one or more computer processors feed the one or more unassociated code standard documents into a cognitive model, wherein the cognitive model utilizes one or more historical code standard documents based on the unassociated code standard documents and associated program analysis rules based on the unassociated code standard documents, wherein the historical code standard documents are natural language documents and the program analysis rules are programmatic. The one or more computer processors generate, based on one or more calculations by the cognitive model, one or more program analysis rules. The one or more computer processors correct one or more programmatic errors or one or more stylistic errors based on the generated one or more program analysis rules.

DETAILED DESCRIPTION

Traditionally, developmental teams have multiple coding standards, principles, and expectations that project developers must adhere to. Coding standards are a set of guidelines, best practices, programming styles, and conventions that ensure developers conform to a common style and technique. Code standards play an important role in guaranteeing code quality and security. This is especially significant during rapid development sessions (e.g., agile, scrum, etc.) where multiple developers may be concurrently working on several submodules that will be eventually combined in a single program or need to work in tandem with other distinct modules. Furthermore, developmental projects may contain multiple developers utilizing different and contrasting program languages or frameworks that are expected to work in unison. This issue is exacerbated during microservice development where the microservice is composed of many discrete components. Program analysis ensures that code standards are adhered at the source code level, but the generation of said program analysis rules from large code standard corpuses is a daunting task. This task is compounded when different departments, corporate entities, and programming languages require distinct standards and conventions.

Embodiments of the present invention recognize that program analysis is improved by the generation of custom program analysis rules based on code standard documents utilizing multiple neural networks. In an embodiment of the present invention, static analysis rules are applied to existing code bases, allowing an organization or team to generate code compliance reports, automatically correct incongruent code, or display sections of code that is not complaint with a standard. In another embodiment of the present invention, static analysis rules are applied to developmental workspaces, allowing correction hints and suggestions to be displayed when incongruent code is detected. Implementation of embodiments of the invention may take a variety of forms, and exemplary implementation details are discussed subsequently with reference to the Figures.

The present invention will now be described in detail with reference to the Figures.

Figure 1:
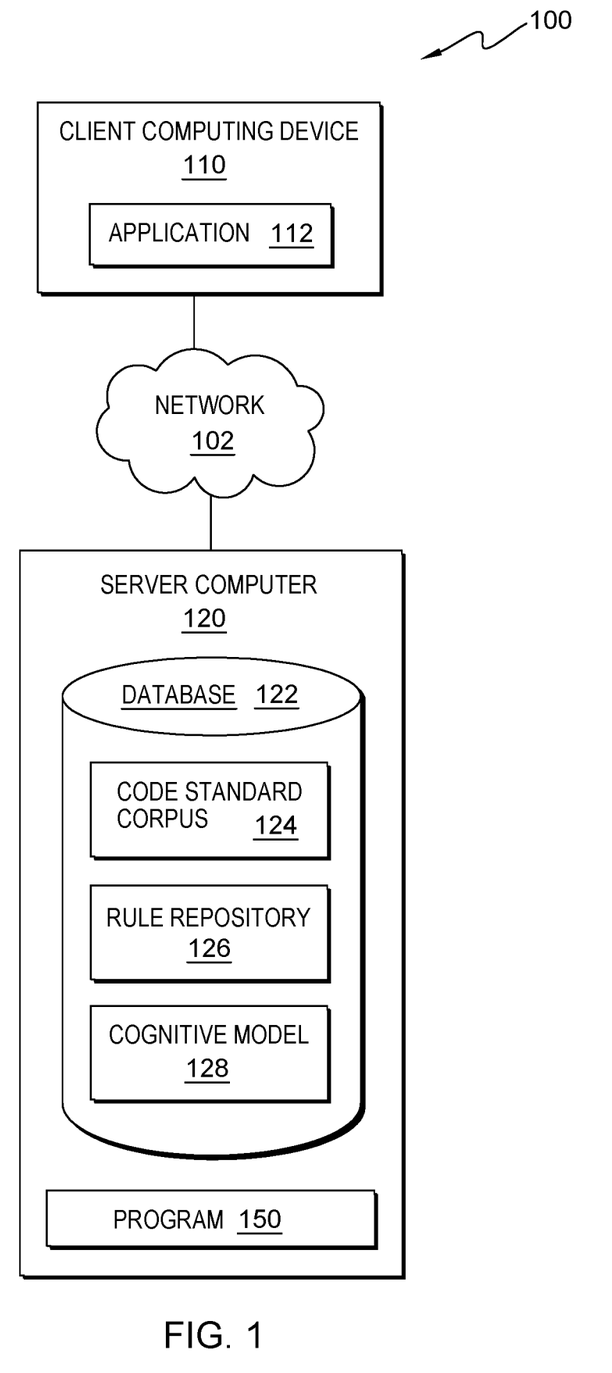
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes client computing device 110 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Client computing device 110 may be a web server or any other electronic device or computing system capable of processing program instructions and receiving and sending data. In some embodiments, client computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, client computing device 110 may represent a server computing system utilizing multiple computers as a server system, such as in a cloud computing environment. In general, client computing device 110 is representative of any electronic device or combination of electronic devices capable of executing machine readable program instructions as described in greater detail with regard to FIG. 4, in accordance with embodiments of the present invention. In the depicted embodiment, client computing device 110 contains application 112.

Application 112 is a program designed to carry out the operations for a specific application to assist a user to perform an activity (e.g., word processing programs, spread sheet programs, media players, web browsers). In an embodiment, application 112 is a source code management system, linter, or version-control tool. In another embodiment, application 112 is a text editor. In the depicted embodiment, application 112 is an integrated development environment (IDE) that resides on client computing device 110. In another embodiment, application 112 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside on client computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. Database 122 stores a plurality of data that might be useful in assessing a code standard document. For example, database 122 may store programmatic conventions, related developmental metadata (data structures, intermediate compilation objects, etc.), historical code standard documents, corresponding program analysis rules, unit tests, and data associated with related linters. In an embodiment, database 122 stores data used by application 112, such as linter templates, program analysis template files, and associated metadata. In the depicted embodiment, database 122 includes code standard corpus 124, rule repository 126, and cognitive model 128.

Code standard corpus 124 may contain one or more instances of code standard documents, hereinafter referred to as documents. In an embodiment, code standard documents are natural language documents. In various embodiments, code standard corpus includes a plurality of documents including, but not limited to, corporate compliance documents, industry compliance documents (e.g., International Organization for Standardization (ISO), International Electrotechnical Commission (IEC), European Committee for Standardization (CEN), Motor Industry Software Reliability Association (MISRA), etc.), programmatic coding conventions (e.g., GNU coding standards, Linux kernel specifications, Agile programming standards, etc.), and specialized security practices. These documents ensure that a complaint code base has consistent code quality, security precautions and measures, compliance with industry, corporate, programmatic standards, and guidelines. In another embodiment, code standard corpus 124 includes documents from programming languages from within a targeted programming language family (syntactically similar programming languages). In an embodiment, code standard corpus 124 contains unprocessed documents. In another embodiment, code standard corpus 124 contains natural language processed (NLP) (e.g., section filtering, sentence splitting, sentence tokenizer, part of speech (POS) tagging, tf-idf, etc.) documents and associated feature sets. In a further embodiment, code standard corpus 124 contains vectorized (i.e., one-hot encoding, word embedded, dimension reduced, etc.) documents as discussed in step 204.

Rule repository 126 may contain one or more instances of program analysis rules, hereinafter referred to as rules. In an embodiment, program analysis rules are computer-readable (contrasting natural language readable documents and rules) and programmatic rules. In another embodiment, rules may include a plurality of computer-readable rules and guidelines dictating naming conventions, indentations, functions, commenting, line breaks, data structures, memory allocation, typedefs, etc. In various embodiments, rule repository 126 includes historical rules from a specified programming language. The specified programming language may be determined by the user or specified in the controlling code standard document. In other embodiments, rule repository 126 includes rules from programming languages from within the specified language family or other syntactically similar programming languages. For example, rule repository 126 contains rules from the C language but also from C++ and C#. In various embodiments, the rules contain corrective descriptions that enable a user to correct a section of code due to a rule (standard) violation. For example, if a user violates a naming convention/rule, then program 150 may retrieve the corrective description corresponding to the violated rule and display the description to the user in an IDE. In an embodiment, rule repository 126 contains unprocessed rules. In another embodiment, rule repository 126 contains NLP processed documents. In a further embodiment, rule repository 126 contains vectorized rules as discussed in step 204. In an embodiment, the rules are formatted in a lint ready structure allowing direct importation into an application (e.g., IDE, text editor, etc.). In another embodiment, rules are formatted as generic files such as eXtensible Markup Language (XML) or JavaScript Object Notation (JSON) files, to provide a templating system for future genericized rules. In various embodiments, rule repository 126 contains links or associations to a corresponding document located in code standard corpus 124, creating a document-rule pair.

Cognitive model 128 utilizes deep learning techniques and multimodal data to generate machine-readable (i.e., exportable) program analysis rules. Specifically, cognitive model 128 utilizes neuromorphic algorithms and models (e.g., long short-term memory (LSTM), deep stacking network (DSN), deep belief network (DBN), convolutional neural networks (CNN), compound hierarchical deep models, etc.) that can be trained with supervised and/or unsupervised methods. In the depicted embodiment, cognitive model 128 utilizes a recurrent neural network (RNN) trained utilizing supervised training methods. In an embodiment, cognitive model 128 utilizes gated recurrent units (GRU). GRUs simplify the training process while reducing the amount of necessary computational resources. In another embodiment, cognitive model 128 utilizes LSTM. LSTM entails a more robust process, requiring more computational resources but LSTM is more effective when training from large datasets. In an additional embodiment, different sets of weights filter the input, output, and forgetting gates. In another embodiment, cognitive model 128 utilizes Adam optimization, a first-order gradient-based optimization of stochastic objective function, during training to calculate an exponential moving average of the gradient and the squared gradient and the adjust the bias parameters, $b_n$, to control the decay rates of the moving averages. In various embodiments, the hidden layers of cognitive model 128 may be unidirectional or bidirectional.

Cognitive model 128 assesses a document by considering multiple features, which may be online or offline and available as structured or unstructured data, by setting and applying relative numerical weights to each feature. Program 150 feeds a vectorized training set of feature data to cognitive model 128. In various embodiments, the code standard document vectors are labeled with an associated rule enabling cognitive model 128 to learn what features are correlated to a specific rule or a subset of a specific rule, prior to use. In various embodiments, the labeled documents include the targeted programming language in addition to the document and the associated rule. The labeled documents are aggregated to form a training set that includes a plurality of labeled features, such as tokenized document-rule pairs, functions, variables, objects, data structures, etc. Cognitive model 128 learns from the training set of data to distinguish between likely and unlikely rules based on a processed and vectorized code standard document. Once trained, cognitive model 128 can generate rules by utilizing one or more calculations based on aggregated vectorized training sets, testing sets, and associated feature vectors. This technique is an effective method for correlating different types of features from multimodal data. The training of cognitive model 128 is depicted and described in further detail with respect to FIG. 2.

Program 150 is a program for generating analysis rules based on code standard documents by retrieving, analyzing, extracting, and creating feature vectors from one or more code standard documents and one or more associated program analysis rules. In an embodiment, program 150 receives or determines the programmatic scope (i.e., whether the code standard documents relate to a specific programming language or syntactically similar programming languages). In yet another embodiment, program 150 aggregates documents and associated rules with applicable data (i.e., labels, programmatic metadata, extracted sub-features, etc.) stored in database 122. In an embodiment, program 150 retrieves coding standard documents and associated program analysis rules. In an embodiment, program 150 may perform preprocessing techniques (e.g., sentence splitting, sentence tokenizer, POS tagging, context extraction, etc.) on sections, sentences, and lines of codes contained within a document and/or associated rule, thus creating document information and rule information (i.e., split, tokenized, labeled, unstructured, or structured data). In a further embodiment, program 150 vectorizes the document and rule information, creating training and testing sets that contain processed and extracted documents, labeling (i.e., associating, relating, etc.) the document information vector with rule information containing the associated, processed and extracted rule. In another embodiment, program 150 utilizes supervised training to train cognitive model 128 based on the training and testing sets. In another embodiment, program 150 processes and vectorizes a code standard document and feeds the extracted document information vector into cognitive model 128, allowing the model to calculate and generate a program analysis rule utilizing the trained cognitive model. In an embodiment, program 150 determines the predictive performance (e.g., memory utilization, CPU utilization, accuracy, precision, overfitting considerations, model fitness, etc.) of cognitive model 128. In a further embodiment, program 150 determines if the model is well trained based on the calculated predictive performance metrics. If program 150 determines the model is not well trained, then program 150 reassigns the model weights and retrains the model. In another embodiment, program 150 marks the incorrect document-rule pair for further user inspection and confirmation. In another embodiment, if program 150 determines that the model is well trained, then program 150, respectively, logs the document, generated rule, and associated information (e.g., programming language, tokenized vectors, code comments, similar business rules, etc.) into code standard corpus 124 and rule repository 126. In addition, program 150 exports the generated rules into an application such as application 112.

In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. Program 150 is depicted and described in further detail with respect to FIG. 2.

Figure 2:
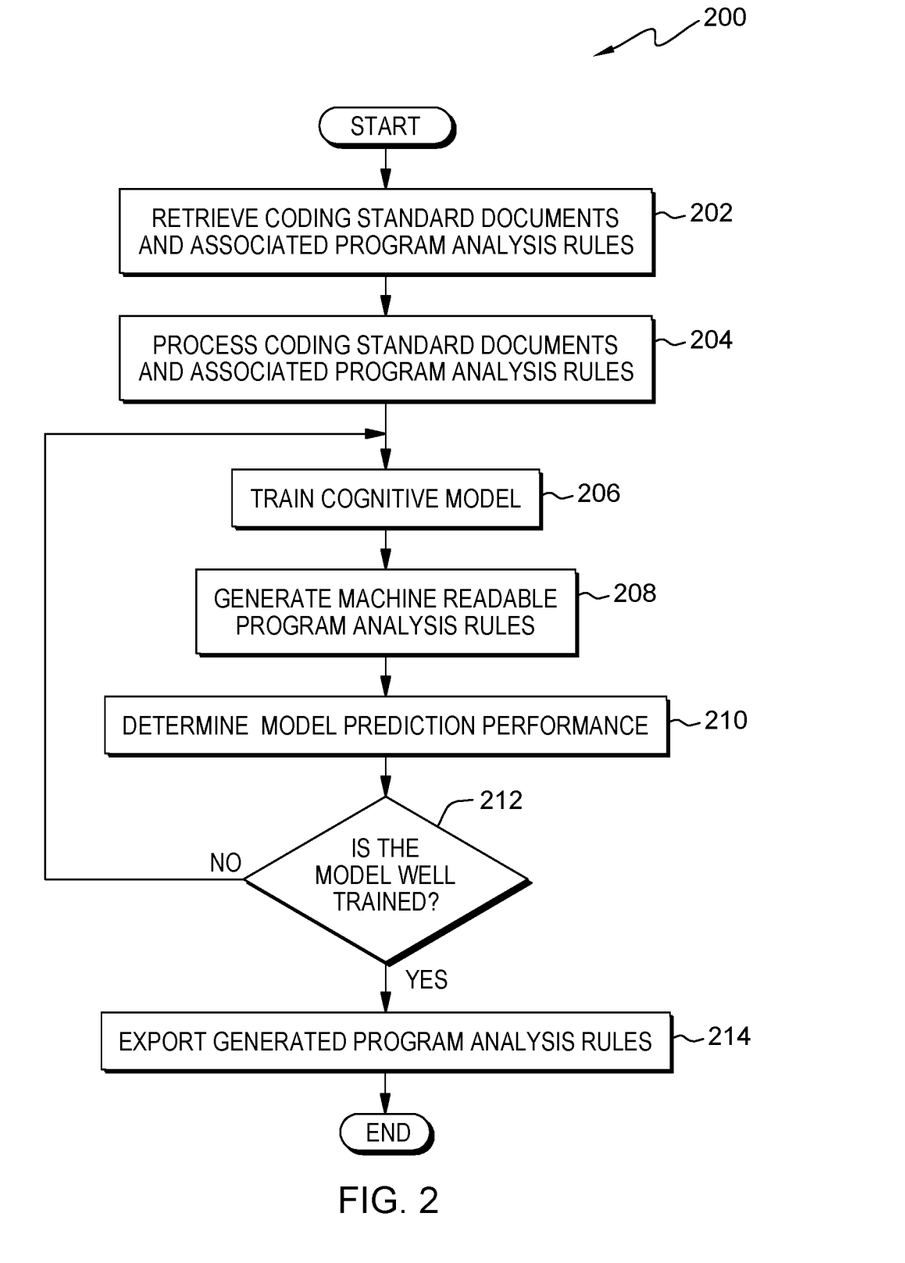
FIG. 2 is a flowchart depicting operational steps of a rule generator program, on a server computer within the computational environment of FIG. 1, generating program analysis rules, in accordance with an embodiment of the present invention.

FIG. 2 is a flowchart depicting operational steps of program 150 for generating program analysis rules, in accordance with an embodiment of the present invention.

In an embodiment, program 150 prompts a user associated with client computing device 110 to determine whether the user grants program 150 access to source directory files, file contents, and code standard documents and repositories. In another embodiments, program 150 prompts a user associated with application 112 to determine whether the user grants program 150 access to the clipboard functionality associated with application 112 and/or to monitor the user input (e.g. keyboard inputs and strokes, etc.) within application 112. In an embodiment, program 150 initiates by a user inputting or by program 150 receiving an unassociated code standard document (document). An unassociated document is any natural language code standard document that is not associated with one or more program analysis rules.

Program 150 retrieves coding standard documents and associated program analysis rules (step 202). Program 150 determines the targeted programming language of a document. In this embodiment, program 150 utilizes natural language processing (NLP) techniques to parse sentences or terms in the document that indicate the targeted program language or languages of the document. In another embodiment, if program 150 cannot determine the targeted programming language through said NLP techniques, then program 150 compares the programmatic conventions (e.g., function names, variable names, available data structures, system functions, etc.) listed in the document with the programmatic conventions listed in historical documents that have known associated targeted programming languages. Through said comparisons, program 150 can calculate and determine the most similar (convention comparisons, structure comparisons, etc.) document and utilize the targeted programming language in that document. In various embodiments, the user submits the targeted programming language to program 150 utilizing, not depicted, a graphical user interface. In another embodiment, program 150 determines the targeted application of the document.

In an embodiment, program 150 retrieves historical code standard documents and associated program analysis rules from code standard corpus 124 and rule repository 126 based on the determined targeted program language or application. In another embodiment, program 150 retrieves historical documents and rules based on the associated governing bodies. For example, if a document is associated with a specific corporation, governing body, or organization, then program 150 may retrieve all documents and rules associated with the specific corporation, governing body, or organization. In various embodiments, program 150 retrieves a subset of historical documents and associated rules, such as, documents created within a defined time period or documents that target a similar programming language (e.g., JavaScript and TypeScript, C++ and C#, etc.). In an alternative embodiment, if code standard corpus 124 does not include any documents or rules specific to the determined target programming language, then program 150 retrieves said documents and rules from a plurality of sources, such as a publicly available external source, and stores said information within code standard corpus 124 and rule repository 126. In various embodiments, program 150 retrieves rule templates associated with either the determined targeted programming language or a targeted developmental application or tool. For example, in the instance where a user is utilizing a JavaScript IDE with a linter, here, program 150 retrieves templates that are readily utilized by the IDE and/or by the linter. In another embodiment, program 150 determines the parameters required by the retrieved templates. In this embodiment, program 150 generates rule parameters needed to fill said templates.

Program 150 processes the retrieved coding standard documents and associated program analysis rules (step 204). Program 150 utilizes NLP techniques to parse and analyze the retrieved documents and associated rules. In an embodiment, program 150 utilizes section filtering to identify distinct categories, sections, themes, or topics within a document. For example, if a document contains the specification sections; "Programming Specifications", "Unit Testing", and "Project Structure", then program 150 identifies and filters each distinct section into a respective rule topic and scope. In a further embodiment, program 150 subdivides each section into specific rule sets governing a specific programmatic convention (e.g., method, parameter, variable names, etc.). In another embodiment, program 150 utilizes sentence boundary disambiguation (sentence splitting) to delineate the boundaries of a sentence within a section or document and parse each sentence into a rule or component of a complex rule. As each sentence/section is processed, program 150 may, in parallel, process the associated rule and utilize said rules as labels for the sentence/section set.

In an embodiment, responsive to the initial processing detailed above, program 150 tokenizes the identified and split terms. Program 150 splits every identified sentence into individual terms and inserts the terms in an array or set, representing the sentence. In an alternative embodiment, the tokenized sentence array is constructed into a set, structure, and/or object containing all identified sentences and terms from a given section, scope, and/or topic. For example, the example code standard sentence, "All variables should be in an camelCase format, words separated by an underscore and contain a complete and clear semantic expression", is tokenized into the array ["All", "variables", "should", "be", "in", "an", "camelCase", "format", "words,", "separated", "by", "an", "underscore", "and", "contain", "a", "complete", "and", "clear", "semantic", "expression"]. In a further embodiment, program 150 removes punctuation (e.g., commas, periods, etc.) and reduces all letters to lowercase thus reducing the number of required feature dimensions. In another embodiment, program 150 may utilize an abbreviation database to expand acronyms. For example, the term "DB" can be expanded into the term "database". In an additional embodiment, program 150 creates sets of identified terms and associates these terms with other terms that appear sequentially in the same sentence and/or section.

In various embodiments, program 150 utilizes syntactic analysis to identify parts of speech and syntactic relations between various portions of the tokenized section or the tokenized sentence. In a further embodiment, program 150 utilizes part-of-speech tagging to identify the part of speech of one or more words in a sentence based on its relationship with adjacent and related words. For example, program 150 utilizes said techniques to identify the nouns, adjectives, adverbs, and verbs in the example code standard sentence: "All variables should be in camelCase format, words separated by an underscore and contain a complete and clear semantic expression". In this example, program 150 identifies "variables", "format", "words", "underscore", and "expression" as nouns, and "separated" and "contain" as verbs.

Program 150 can utilize term frequency-inverse document frequency (tf-idf) techniques to calculate how important a term or word is to the sentence or to the document. In an embodiment, program 150 utilizes tf-idf to calculate a series of numerical weights for the terms extracted from a document. In a further embodiment, program 150 utilizes said calculations to identify and weigh frequently used terms. For example, program 150 increases the weight of a word proportionally to the frequency the word appears in the documents and associated rules offset by the frequency of other documents and rules, in code standard corpus 124 and rule repository 126, that contain the term. Low tf-idf valued terms can be safely removed in order to decrease the number of features and high tf-idf valued terms can be assigned a higher weight signifying greater importance to the set.

In an embodiment, program 150 partitions the tokenized and processed sentences/sections into multiple training and testing sets paired with associated rule labels. In another embodiment, program 150 partitions documents into discrete sets containing multiple versions of the same document and rule but processed utilizing different NLP techniques. In yet another embodiment, program 150 constructs subsets by identifying the scope of the associated rule and segmenting the documents or document sections into discrete section, subject, or category sets. For example, a section contains a code standard document may govern project structures, here, program 150 may identify each code standard and partition the code standards and the associated rules into distinct document and rule sets. In various embodiments, program 150 non-deterministically divides the processed sets into training sets and test sets. In a further embodiment, program 150 attaches a corresponding rule to each sentence/section set as a label.

Program 150 can vectorize the partitioned document (e.g., section and sentence sets) and rule sets. In an embodiment, program 150 utilizes one-hot encoding techniques to vectorize categorical or string-based (word/term based) feature sets. For example, when vectorizing feature sets of individual words, program 150 creates a one-hot encoded vector comprising a 1×N matrix, where N symbolizes the number of distinguishable terms. In this embodiment, program 150 utilizes one-hot encoding to recode categorical data into a vectorized form. For example, when vectorizing an example term feature set consisting of [positive, numerical, string], program 150 encodes said corresponding feature set into the array containing [[1, 0, 0], [0, 1, 0], [0, 0, 1]]. In one embodiment, program 150 utilizes featuring scaling techniques (e.g., rescaling, mean normalization, etc.) to vectorize and normalize numerical feature sets. In various embodiments, program 150 utilizes word embedding techniques such as word2vec or doc2vec to produce vectors which denote similarities between words that share common contexts. Word embedding techniques create word-based vectors, similar to one-hot encoding, although word embedding creates vectors that are structured so that similar words are positioned in close proximity to each other in the vector space. Another distinction between one-hot encoding and word embedding is that word embedding allows for a vector space dimension to include multiple words while one-hot encoding creates vector spaces with one dimension per word. For example, the sentence "the quick brown fox jumps over the lazy dog" and specifically the word fox could be word embedded as the vector [0, 0, 1, 1, 1, 0, 0, 0], encompassing the word "fox" along with "brown" and "jumps". Word embedding vectors reduce the number of dimensions thus increasing the training speed of the model and reducing system memory requirements. In another embodiment, program 150 utilizes dimension reducing techniques, such as feature extraction, low-dimensional embedding, and kernelling, to reduce the number of dimensions required to represent the training data and features. Reducing the numbers of required dimensions (e.g., features, variables, etc.) reduces the needed time and storage space, improves the interpretation of the parameters of the cognitive model, allows data visualization in low dimensions such as 2D or 3D and avoids peaking phenomena.

Program 150 trains the cognitive model (step 206). In an embodiment, program 150 initializes cognitive model 128 with randomly generated weights. In an alternative embodiment, program 150 initializes cognitive model 128 with weights calculated from the analysis described above in step 204 (e.g., tf-idf, etc.). In this embodiment, certain terms or words are weighted higher than others allowing the model to learn at a quicker rate with fewer computational resources. In the depicted embodiment, cognitive model 128 is represented as a recurrent neural network. In alternative embodiments, cognitive model 128 may be represented as a simple neural network or a specialized neural network such as Markov chains, perceptron, deep feed forward (DFF), Boltzmann machine, support vector machine (SVM), neural Turing machine, etc.

Program 150 can train cognitive model 128 by feeding the processed, feature vectors into cognitive model 128. In an embodiment, program 150 trains cognitive model 128 with a plurality of feature vectors originating from the sets extracted from the documents and associated rules located in code standard corpus 124. In a further embodiment, program 150 extracts document information from the processed documents which may include programmatic conventions, similar programming languages and families, and associations to other relevant and similar sections of the document or to documents that govern other similar programming languages and conventions. In a further embodiment, additional rule information includes but is not limited to, code complexity (e.g., amount of lines, imported modules, etc.), intermediate representation objects and the target programming language along with related programming languages and associated programmatic conventions.

In various embodiments, program 150 determines which variation of a recurrent neural network to utilize. In a further embodiment, program 150 utilizes LSTM and/or GRU. In this embodiment, program 150 determines which variation of neural network to use based on the size of the corpus and training data. For example, for larger sets of training sets LSTM is utilized and for smaller sets GRU is utilized. In another embodiment, program 150 may utilize unidirectional or bidirectional hidden layers. Bidirectional hidden layers connect hidden layers of opposite directions to the same output allowing for the output layer to receive information from past and future states simultaneously. Bidirectional hidden layers allow for the context of an input (e.g., term, word, etc.) to be considered along with the input. Unidirectional hidden layers only pass information to future states therefore unidirectional hidden layers allow for less contextual information available to the output layer.

In an embodiment, program 150 utilizes processed training sets to perform supervised training of cognitive model 128. As would be recognized by one skilled in the art, supervised training determines the difference between a prediction and a target (i.e., the error), and back-propagates the difference through the layers such that cognitive model 128 "learns". In an embodiment, program 150 determines whether a sufficient accuracy is obtained by utilizing test sets and the associated test labels. In another embodiment, program 150 utilizes cross-entropy (e.g., Kullback-Leibler (KL) divergence, etc.) as a loss function to determine the level of accuracy of the model. In this embodiment, program 150 compares the predicted sequence (e.g., the generated rule) with the expected sequence (e.g. the historical document). In yet another embodiment, program 150 may utilize the cross-entropy loss value to calculate a word error rate which further denotes the level of accuracy per word in a generated rule. In this embodiment, program 150 determines sufficient accuracy based on the word error rate generated by cognitive model 128. If the calculated accuracy is insufficient, then program 150 continues with supervised training of cognitive model 128. If the calculated accuracy is determined sufficient, then program 150 ends the training process.

Program 150 generates machine readable program analysis rules (step 208). Program 150 utilizes the trained model and the learned weights and layers to predict and generate the next term in a sequence (e.g., program analysis rule) given a target sequence (code standard document sentences/sections). In one embodiment, utilizing the output of cognitive model 128, program 150 generates a series of terms and associated probabilities. Said probabilities denote the chance that the predicted term is the next term in the sequence. In an embodiment, program 150 utilizes a softmax layer in order to normalize the input vector (e.g., one-hot encoded and vectorized document, sequence of word embedded terms, etc.) of K real numbers into a probability distribution consisting of K probabilities. In this embodiment, the softmax layer converts the output vector (e.g., predicted sequence) into a probability contained in the interval (0, 1), for example 0.58 or 58%. In an embodiment, program 150 selects the most probable term (e.g., the term with the highest attached probability). In another embodiment, program 150 prompts the user with the top predicted terms and allows the user to select the next term in the sequence. In a further embodiment, program 150 prompts the user if no predicted term meets a predetermined probability threshold. For example, if a probability threshold is set at a 50% and no predicted terms have a probability greater than 50%, then program 150 prompts the user with a list of the predicted terms. In yet another embodiment, responsive to the prediction and generation of a term, program 150 appends the generated term to the end of the sequence and feeds the new sequence into cognitive model 128 for the prediction and generation of consecutive terms. In various embodiments, program 150 halts feeding sequences and vectors into cognitive model 128 if the predicted probability of all the terms falls under a predetermined probability threshold level, for example 50%.

In an embodiment, the generated rules may include, but not limited to, target application, target programming language, target system, description of rule, description of corrective measures, and associated rule templates. In various embodiments, program 150 generates rules specific to the target program language or target application contained in the documents. For example, if program 150 determines that the programming language of the retrieved documents is JavaScript, then program 150 generates rules based in JavaScript or a language compatible with JavaScript. In an embodiment, program 150 generates rules conforming to a plurality of analysis rule tools such as ESLint for JavaScript, Lint for the C language and Pylint for the python language. In an embodiment, program 150 generates program analysis rule parameters that can be inserted into preconstructed machine-readable rule templates according to a plurality of specifications such as targeted programming languages, specialized dependencies, availability of developmental tools (IDEs, linters, version-control applications, etc.), etc. In various embodiments, program 150 creates configuration (e.g., XML) files that include the generated rules. In an example, program 150 processes (sentence splitting, tf-idf, etc.) the sentence "Variable names should not contain the term foo" and reduces the sentence into the following set of terms ["variable", "name", "not", "contain", "term", "foo"]. In this example, program 150 may generate the following JavaScript (e.g., ESLint) program analysis rule:

---

Code Snippet - 1 Generated JavaScript ESLint Rule

```
module.exports = {
    meta: {
        messages: {
            avoidName: "Avoid using variables named '{{ name }}'"
        }
    },
    create(context) {
        return {
            Identifier(node) {
                if (node.name === "foo") {
                    context.report({
                        node,
                        messageId: "avoidName",
                        data: {
                            name: "foo",
                        }
```

Code Snippet - 1 Generated JavaScript ESLint Rule

```
            });
          }
        }
      };
    }
};
```

Program 150 determines the prediction performance of the model (step 210). In an embodiment, responsive to generating a machine-readable analysis rule, program 150 may prompt and receive user feedback through a graphical user interface on client computing device 110 (not depicted). For example, after program 150 analyzes a document, the user can provide feedback for the document and the generated rule on a user interface. In various embodiments, user feedback may include a simple positive or negative response. In these embodiments, program 150 may use one or more NLP techniques to determine whether the response of the user is positive or negative. In another embodiment, feedback may include a user score or numerical value representing user confidence in the generated rule. For example, if program 150 generates an incorrect rule, the user can provide negative feedback and provide an accurate rule. The feedback may include user indications or markers regarding what portions of the generated rule were correct or incorrect. Program 150 may adjust corresponding weights in order to reassess the document and conform to the feedback.

In another embodiment, responsive to generating a machine-readable analysis rule, program 150 runs a plurality of model assessments including, but not limited to, model fit assessments, k-fold cross validation, mean bias error, modified Nash-Sutcliffe efficiency, root mean square error, and correlation coefficient. Program 150 initiates said assessments to determine the prediction performance (e.g., accuracy, precision, memory utilized, time constraints, etc.) of cognitive model 128. In an embodiment, program 150 utilizes model fit assessments to calculate descriptive model statistics such as actual/expected values, cumulative sum, and sign testing. In various embodiments, program 150 utilizes k-fold cross validation to calculate a fitness measure as an estimate of model prediction performance. In this embodiment, program 150 constructs a temporary copy of cognitive model 128 and trains said copy with code standard corpus 124 and rule repository 126, as detailed in step 206, but including the addition of the generated rule and the associated document, section, or category. In an embodiment, program 150 partitions the training set into k sized subsets. Of the k subsets, program 150 retains a single subset, the testing set, and the remaining k-1 subsets are used as training data. Program 150 then repeats the cross-testing process k times, with each of the k subsets used exactly once as a testing set. The k results can then be averaged to produce a single estimation of prediction performance. In this embodiment, program 150 utilizes the multiple calculated estimations of prediction performance to generate a generalized fitness measure of the model.

Program 150 can create historical trend regression models allowing the tracking of historical model accuracy and prediction performance metrics. In an embodiment, program 150 maintains multiple historical trend regression models for each calculated prediction performance metric. In a further embodiment, program 150 logs and maintains records for each prediction performance metric for each model training and testing iteration. In this embodiment, program 150 maintains a copy of the cognitive model for each model iteration (e.g., model training, insertion, or deletion to documents and/or rules in training and/or testing sets), allowing comparisons of historical cognitive models. In various embodiments, program 150 constructs and maintains separate historical trend regression models for each calculated prediction performance metric.

If program 150 determines that the model is not well trained ("no" branch, decisions block 212), then program 150 returns to training the model (step 206). In an embodiment, program 150 establishes tolerance regions triggering actions (e.g., warning messages, model retraining, modification of the training and testing sets, etc.) dependent on the tolerance region triggered. Tolerance regions are numeric upper/lower boundary thresholds that may include delta levels (rapid changes in model fitness), outlier results (large deviations from a regression line), and overfitting measures (extreme prediction accuracy). In another embodiment, program 150 establishes said tolerance regions for each historical trend regression model. In yet another embodiment, program 150 continuously monitors the fitness of the model allowing for timely warnings when a prediction performance metric deviates out of a tolerance region or a specified threshold. In various embodiments, a warning message (e.g., email, SMS, etc.) is sent by program 150 when a prediction performance metric exceeds a tolerance region. In various embodiments, if a performance measure of cognitive model 128 falls within a tolerance region, then program 150 determines that the model is not well trained. In various embodiments, program 150 establishes prediction performance thresholds, for each identified rule category, training set, or family of documents. In a further embodiment, said thresholds can be predefined by a user. In another embodiment, said thresholds are calculated based on the distribution of the assessment tests run in step 210. For example, if a metric is normally distributed, then program 150 may set a confidence threshold of 90% (z-score of 1.645), or within 3 standard deviations. In an additional embodiment, if the user indicates that the generated rule is insufficient or lacking, then program 150 may determine that cognitive model is not well trained. In a further embodiment, the user may submit a corrected rule based on a specific section, sentence, or portion of a document. In this embodiment, program 150 returns to step 206 and trains the cognitive model with the user corrected rule supplanting the program 150 generated rule.

If program 150 determines that the model is well trained ("yes" branch, decision block 212) then program 150 exports the generated program analysis rules (step 214). In an embodiment, program 150 logs the document and the generated rule into code standard corpus 124. In various embodiments, the generated rules are exported to a plurality of developmental tools including, but not limited to, IDE workspaces, version-control software (e.g., Git, Mercurial, Subversion, etc.), text editors (vim, gedit, nano, etc.) and software development tools (e.g., compliers, linters, etc.). In one embodiment, as users write code within an IDE or text editor, the exported rules are utilized to provide on-the-fly code correction suggestions. Said hints occur when the user writes or submits code that does not conform with a controlling coding standard and its associated rule. For example, in the instance where a corporate code standard document dictates that all function names must be capitalized, an IDE utilizing generated rules may highlight, underline, notify, modify, and/or automatically correct the portion of the incongruent code. In this situation, the sent user notification may include the portion of incongruent code, hints to rectify the code, and an indication that the code was automatically modified to conform with the code standard document and associated generated rules.

In an embodiment, the generated rules are exported to a source code management system or version-control tool. In this embodiment, when a user commits source code into a code repository, the source code management system utilizes the exported rules to scan and analyze the committed code for any code standard inconsistencies, incongruencies, or issues. In this embodiment, the source code management system may notify the user regarding the areas of incongruent code or the source code management system may automatically correct the incongruent sections of code. In another embodiment, a version-control tool may prevent the incongruent code from being transmitted to the repository if it contains incongruent code. In various embodiments, generated rules are also imported to a source code reporting system that scans, analyzes, and generates reports utilizing code standards compliance as a metric of code quality.

Figure 3:
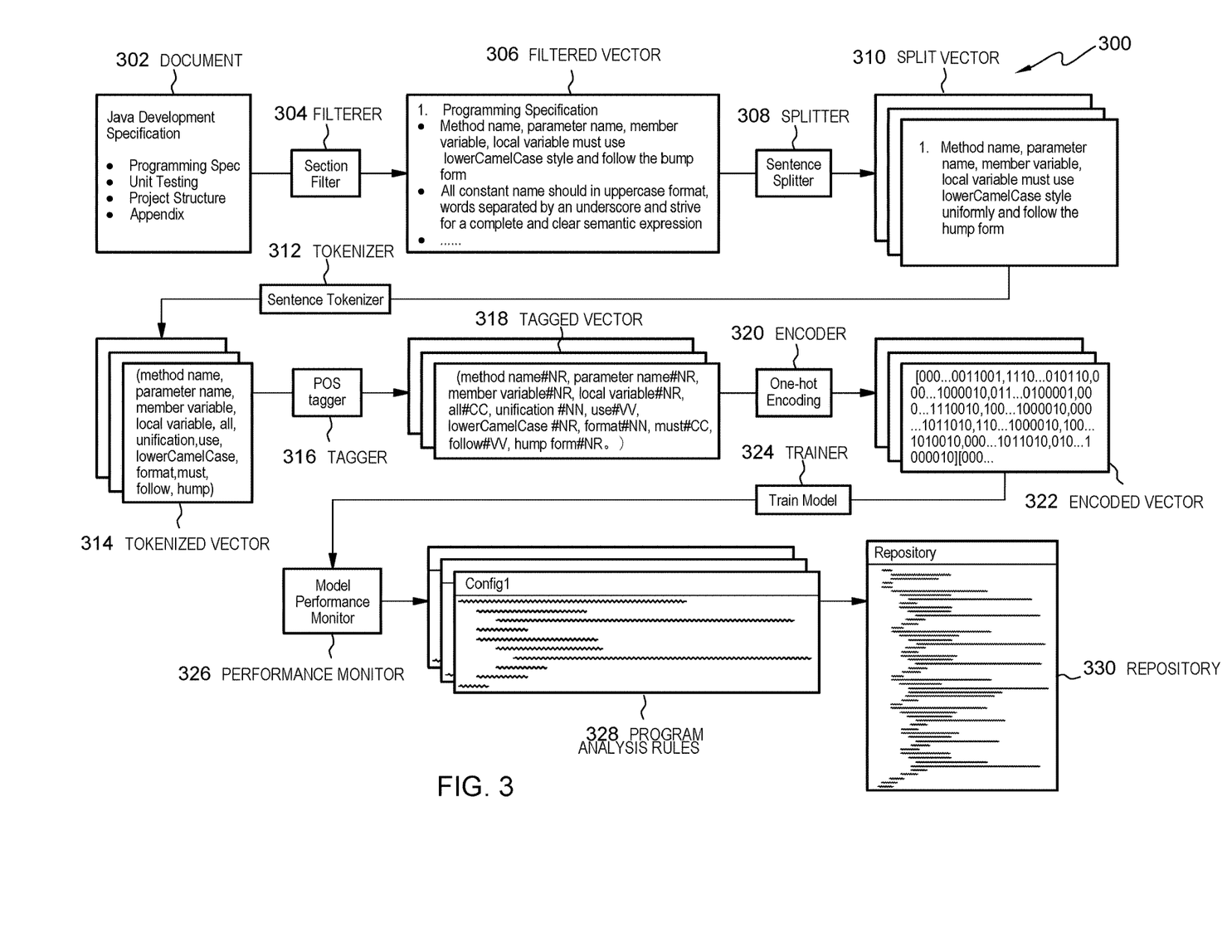
FIG. 3 depicts flowchart embodiment 300, which is an example illustration of flowchart 200 depicting an embodiment to generating program analysis rules.

FIG. 3 depicts flowchart embodiment 300, which is an example illustration of flowchart 200 depicting an embodiment to generating program analysis rules. Flowchart embodiment 300 contains document 302, a natural language code standard document, filterer 304, a natural language processor that separates a document by section or topic, filtered vector 306, the result vector outputted by filterer 304, splitter 308, a natural language processor that separates a section or paragraph into individual sentences, split vector 310, a result vector outputted by splitter 308, tokenizer 312, a processor that receives a stream of characters and breaks the stream into individual tokens, tokenized vector 314, a result vector of tokens outputted by tokenizer 312, tagger 316, a natural language processor that applies part of speech tagging to a vector of terms, tagged vector 318, a result vector outputted by tagger 316, encoder 320, is a processor that converts categorical variables into a numerical form, encoded vector 322, a one-hot encoded vector outputted by encoder 320, trainer 324, a cognitive model trainer that utilizes one or more training and testing sets, performance monitor 326, a testing suite that preforms measurements on prediction performance of a trained model, program analysis rule 328, generated analysis rules based on a trained model, and repository 330, an example code repository. Many modifications to the depicted environment may be made.

In a detailed example of flowchart 200, a user initiates program 150 by inputting or inserting an unidentified and/or new code standard document (e.g., document 302), in a natural language format, into program 150 or by instructing program 150 to retrieve a plurality of historical code standard documents containing or related to a specified programming language. Program 150 retrieves historical code standard documents and associated program analysis rules from code corpus 124 and rule repository 126. Program 150 filters, processes, vectorizes, and encodes the historical code standard documents and associated program analysis rules and trains cognitive model 128.

Responsive to the trained model, program 150 applies a section filter (e.g., filterer 304), utilizing natural language processing techniques, to the unidentified code standard document to parse distinct sections, conventions, scopes, and themes. Program 150 then applies sentence splitting techniques (e.g., splitter 308) and sentence tokenization (e.g., tokenizer 312) to the parsed section (e.g., filtered vector 306), constructing one or more sets containing separated terms (e.g., split vector 310 and tokenized vector 314). Program 150 then applies one-hot encoding (e.g., encoder 320), converting the tokenized sets into sets containing 0 and 1s, representing the tokenized sets (e.g., encoded vector 322). Said one-hot encoded sets are vectorized and applied to the trained cognitive model 128 (e.g., trainer 324). Program 150 utilizes trained cognitive model 128 to calculate and generate one or more program analysis rules (e.g., program analysis rules 328). The unidentified code standard document and the generated program analysis rules are added to code corpus 124 and rule repository 126. Program 150 retrains cognitive model 128 as described above. Responsive to the retrained model, program 150 calculates the prediction performance parameters of the model (e.g., performance monitor 326), determining whether the generated program analysis rules are sufficiently accurate. The generated program analysis rules are exported to an internal or external code repository (e.g., repository 330), where program 150 autocorrects and modifies programmatic and stylistic defects within the stored code based on the exported program analysis rules.

Figure 4:
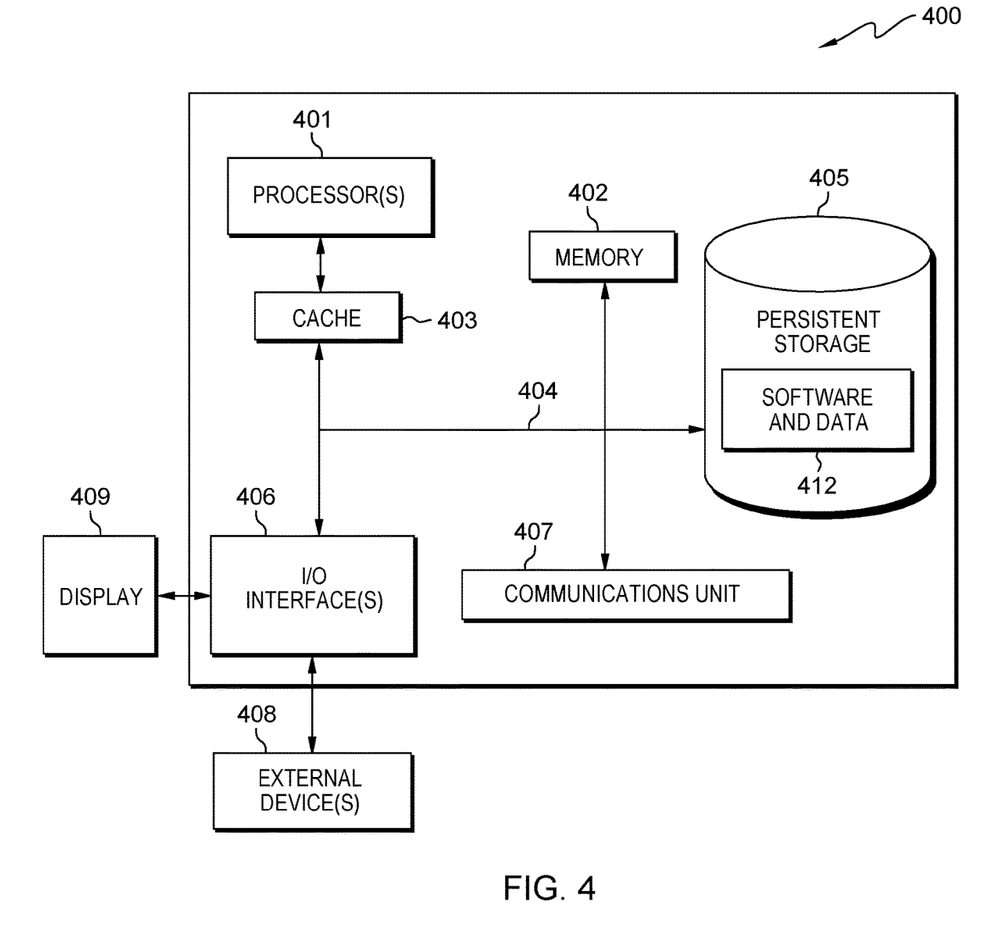
FIG. 4 is a block diagram of components of the server computer executing the rule generator program, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (110) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to client computing device 110. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more computer processors, one or more unassociated code standard documents;
   feeding, by one or more computer processors, the one or more unassociated code standard documents into a cognitive model, wherein the cognitive model utilizes one or more historical code standard documents based on the unassociated code standard documents and associated program analysis rules based on the unassociated code standard documents, wherein the historical code standard documents are natural language documents and the program analysis rules are programmatic;
   generating, by one or more computer processors, based on one or more calculations by the cognitive model, one or more program analysis rules; and
   correcting, by one or more computer processors, one or more programmatic errors or one or more stylistic errors based on the generated one or more program analysis rules.

2. The method of claim 1, further comprises:
   creating, by one or more computer processors, one or more training sets based on the retrieved historical code standard documents and associated program analysis rules;
   creating, by one or more computer processors, one or more testing sets based on the retrieved code standard documents and associated program analysis rules; and
   training, by one or more computer processors, the cognitive model utilizing one or more supervised training methods, wherein the supervised training methods utilize the one or more created training sets and testing sets.

3. The method of claim 1, further comprises:
   calculating, by one or more computer processors, one or more cognitive model performance parameters;
   determining, by one or more computer processors, whether at least one performance parameters exceeds a performance threshold; and
   responsive to determining that at least one performance parameter exceeds the performance threshold; retraining, by one or more computer processors, the cognitive model.

4. The method of claim 1, further comprises:
   exporting, by one or more computer processors, the generated one or more program analysis rules.

5. The method of claim 4, further comprises:
   exporting, by one or more computer processors, the generated one or more program analysis rules to a code repository.

6. The method of claim 4, further comprises:
   exporting, by one or more computer processors, the generated one or more program analysis rules to an integrated development environment.

7. The method of claim 1, further comprises:
   determining, by one or more computer processors, a target application;
   retrieving, by one or more computer processors, a rule template associated with the determined target application;
   modifying, by one or more computer processors, the generated one or more program analysis rules to conform with the retrieved rule template; and
   exporting, by one or more computer processors, the modified rule template.

8. The method of claim 1, further comprises:
   determining, by one or more computer processors, a target programming language;
   retrieving, by one or more computer processors, a rule template associated with the determined programming language;
   modifying, by one or more computer processors, the generated one or more program analysis rules to conform with the retrieved rule template; and
   exporting, by one or more computer processors, the modified rule template.

9. The method of claim 1, wherein the one or more program analysis rules contains information selected from the group consisting of: target application, target programming language, target system, description of rule, description of corrective measures, and associated rule templates.

10. The method of claim 1, wherein the cognitive model is a recurrent neural network.

11. A computer program product comprising:
    one or more computer readable storage media and program instructions stored on the one or more computer readable storage media, the stored program instructions comprising:
    program instructions to identify one or more unassociated code standard documents;
    program instructions to feed the one or more unassociated code standard documents into a cognitive model, wherein the cognitive model utilizes one or more historical code standard documents based on the unassociated code standard documents and associated program analysis rules based on the unassociated code standard documents, wherein the historical code standard documents are natural language documents and the program analysis rules are programmatic;

program instructions to generate, based on one or more calculations by the cognitive model, one or more program analysis rules; and program instructions to correct, one or more programmatic errors or one or more stylistic errors based on the generated one or more program analysis rules.

12. The computer program product of claim 11, further comprises:

program instructions to create one or more training sets based on the retrieved historical code standard documents and associated program analysis rules;

program instructions to create one or more testing sets based on the retrieved code standard documents and associated program analysis rules; and program instructions to train the cognitive model utilizing one or more supervised training methods, wherein the supervised training methods utilize the one or more created training sets and testing sets.

13. The computer program product of claim 11, further comprises:

program instructions to calculate one or more cognitive model performance parameters;

program instructions to determine whether at least one performance parameters exceeds a performance threshold; and responsive to determining that at least one performance parameter exceeds the performance threshold; program instructions to retrain the cognitive model.

14. The computer program product of claim 11, wherein the cognitive model is a recurrent neural network.

15. The computer program product of claim 11, wherein the one or more program analysis rules contains information selected from the group consisting of: target application, target programming language, target system, description of rule, description of corrective measures, and associated rule templates.

16. A computer system comprising:

one or more computer processors;

one or more computer readable storage media; and program instructions stored on the computer readable storage media for execution by at least one of the one or more processors, the stored program instructions comprising:

program instructions to identify one or more unassociated code standard documents;

program instructions to feed the one or more unassociated code standard documents into a cognitive model, wherein the cognitive model utilizes one or more historical code standard documents based on the unassociated code standard documents and associated program analysis rules based on the unassociated code standard documents, wherein the historical code standard documents are natural language documents and the program analysis rules are programmatic;

program instructions to generate, based on one or more calculations by the cognitive model, one or more program analysis rules; and program instructions to correct, one or more programmatic errors or one or more stylistic errors based on the generated one or more program analysis rules.

17. The computer system of claim 16, further comprises:

program instructions to create one or more training sets based on the retrieved historical code standard documents and associated program analysis rules;

program instructions to create one or more testing sets based on the retrieved code standard documents and associated program analysis rules; and program instructions to train the cognitive model utilizing one or more supervised training methods, wherein the supervised training methods utilize the one or more created training sets and testing sets.

18. The computer system of claim 16, further comprises:

program instructions to calculate one or more cognitive model performance parameters;

program instructions to determine whether at least one performance parameters exceeds performance threshold; and responsive to determining that at least one performance parameter exceeds the performance threshold; program instructions to retrain the cognitive model.

19. The computer system of claim 16, wherein the cognitive model is a recurrent neural network.

20. The computer system of claim 16, wherein the one or more program analysis rules contains information selected from the group consisting of: target application, target programming language, target system, description of rule, description of corrective measures, and associated rule templates.

* * * * *